No. 829,116. PATENTED AUG. 21, 1906.
L. H. MARTELL.
PACKING FOR PISTON RODS.
APPLICATION FILED DEC. 22, 1905.
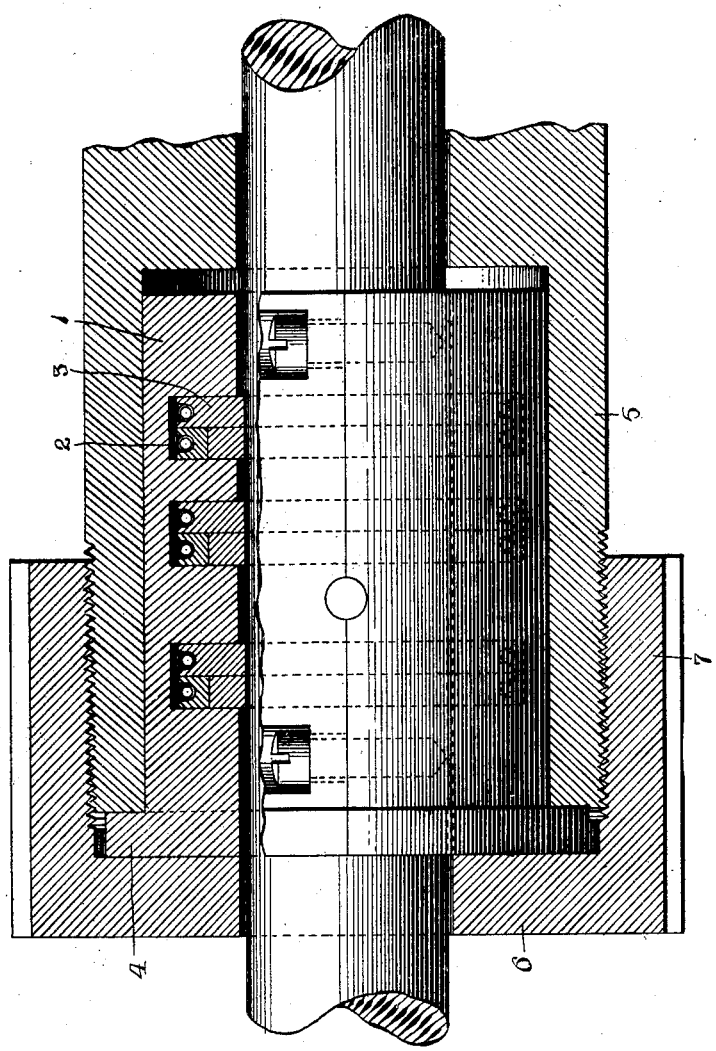
WITNESSES:
INVENTOR
Louis H. Martell
by Christy and Christy
Att'ys

UNITED STATES PATENT OFFICE.

LOUIS H. MARTELL, OF ELLWOOD CITY, PENNSYLVANIA.

PACKING FOR PISTON-RODS.

No. 829,116.            Specification of Letters Patent.            Patented Aug. 21, 1906.

Application filed December 22, 1905. Serial No. 292,974.

*To all whom it may concern:*

Be it known that I, LOUIS HENRY MARTELL, a citizen of the United States, residing at Ellwood City, in the county of Lawrence and State of Pennsylvania, have invented or discovered certain new and useful Improvements in Packing for Piston-Rods, of which improvements the following is a specification.

The invention described herein relates to certain improvements in packings for piston-rods, and has for its object a construction of cage or case for the packing-rings permitting the free expansion thereof when secured in position without liability of its being injured or the movements of the rings being interfered with.

The invention is hereinafter more fully described and claimed.

In the accompanying drawing, forming a part of this specification, is shown, partly in section and partly in elevation, a piston-rod and packing embodying my improvement.

Heretofore it has been customary to arrange the packing-rings in grooves formed in the inner periphery of a cage or case fitting in the stuffing-box and held in position by the gland. As the grooves for the packing-rings necessarily extend nearly through the wall of the case or cage, the end pressure thereon will cause a collapsing or movement toward each other of the walls of the grooves and a binding thereof on the rings or a rupture of their walls forming the rear of the grooves. In order to overcome these objectionable features, the cage or case 1, with grooves 2 for the packing-rings 3, which may be of any desired or suitable construction, is made somewhat longer than heretofore and is provided with a peripheral flange 4 at its outer end. This flange is made of sufficient width to project over the end of the stuffing-box 5 and is held in position by the gland 6, which may be secured to the stuffing-box in any suitable manner, but is preferably provided with an internally-threaded cup-shaped portion 7, adapted to screw onto the stuffing-box. As the case or cage is somewhat shorter than the stuffing-box and is secured only at its outer end it will not be subjected to any pressure tending to close the grooves 2 or rupture the thin rear walls of the grooves.

I claim herein as my invention—

1. A packing for piston-rods having in combination a cage or case for packing-rings provided with grooves in its interior wall, metal packing-rings arranged in said grooves and means for securing the cage or case in said box with a freedom of longitudinal movement.

2. A packing for piston-rods having in combination a cage or case for packing-rings provided with grooves in its interior wall, metal packing-rings arranged in said grooves and means for attaching one end of the cage or case to the stuffing-box.

3. A packing for piston-rods having in combination a stuffing-box, a cage or case arranged in the stuffing-box and provided with a peripheral flange projecting over the end of the box, a gland for clamping the flange onto the stuffing-box, said case or cage having grooves in its interior wall and metal rings arranged in said grooves.

In testimony whereof I have hereunto set my hand.

LOUIS H. MARTELL.

Witnesses:
     CHARLES BARNETT,
     J. C. MCCORMICK, Jr.